United States Patent
Smith et al.

(10) Patent No.: US 11,494,183 B1
(45) Date of Patent: Nov. 8, 2022

(54) EXECUTOR MICROSERVICES FOR AUTOMATED APPLICATION COMPLIANCE PROCESSING

(71) Applicant: Evernorth Strategic Development, Inc., St. Louis, MO (US)

(72) Inventors: Anthony Smith, San Diego, CA (US); Alexandra R. Butera, Phoenixville, PA (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 0 days.

(21) Appl. No.: 17/357,144

(22) Filed: Jun. 24, 2021

(51) Int. Cl.
| | |
|---|---|
| G06F 9/44 | (2018.01) |
| G06F 9/455 | (2018.01) |
| G06F 9/445 | (2018.01) |
| G06F 8/75 | (2018.01) |
| G06F 8/60 | (2018.01) |
| G06F 16/11 | (2019.01) |
| G06F 9/54 | (2006.01) |
| G06Q 40/08 | (2012.01) |

(52) U.S. Cl.
CPC ............... G06F 8/75 (2013.01); G06F 8/60 (2013.01); G06F 9/541 (2013.01); G06F 16/113 (2019.01); G06Q 40/08 (2013.01)

(58) Field of Classification Search
CPC . G06F 8/75; G06F 16/113; G06F 8/60; G06F 9/541; G06Q 40/08
See application file for complete search history.

(56) References Cited

U.S. PATENT DOCUMENTS

| | | |
|---|---|---|
| 9,898,269 B2 * | 2/2018 | Pillay .................. G06F 8/71 |
| 10,230,571 B2 | 3/2019 | Rangasamy |
| 10,592,402 B2 | 3/2020 | Reeve |
| 10,592,403 B2 | 3/2020 | Reeve |
| 10,635,572 B2 | 4/2020 | Yabusaki |
| 10,896,084 B2 | 1/2021 | Bagarolo |
| 10,951,692 B1 | 3/2021 | Kozhaya |

(Continued)

OTHER PUBLICATIONS

Aujla et al., COM-PACE: Compliance-Aware Cloud Application Engineering Using Blockchain, 9 pages (Year: 2019).*

Primary Examiner — Thuy Dao
(74) Attorney, Agent, or Firm — Harness IP (57) ABSTRACT

A computerized method for automated application compliance processing includes receiving a compliance check request for an application in development via a continuous integration environment, and obtaining one or more compliance articles that are associated with the application and each define at least one compliance requirement. The method includes identifying one or more executor microservices that are associated with each obtained compliance article, and are each specific to a corresponding automated code analysis module. The method includes calling each of the identified one or more executor microservices to obtain structured compliance data from the corresponding automated code analysis module via the executor microservice, automatically determining a compliance posture of the application according to a comparison of the structured compliance data with one or more compliance requirements of each obtained compliance article, and selectively deploying the application to a production environment according to the determined compliance posture of the application.

20 Claims, 6 Drawing Sheets

(56) References Cited

U.S. PATENT DOCUMENTS

| | | |
|---|---|---|
| 10,970,067 B1 | 4/2021 | Gupta |
| 2003/0009305 A1 | 1/2003 | Eden |
| 2018/0285165 A1 | 10/2018 | Helsley |
| 2020/0302066 A1 | 9/2020 | Krishnaswamy |

* cited by examiner

EXECUTOR MICROSERVICES FOR AUTOMATED APPLICATION COMPLIANCE PROCESSING

FIELD

The present disclosure relates to executor microservices for automated compliance processing, such as applications developed in continuous integration environments.

BACKGROUND

The process of checking and ensuring the compliance posture of a software application is often a manual "spot-checked" process where application developers are required to search and locate data to gather from existing information systems. The requirements for application compliance can change from year to year, and application developers often are not aware of the compliance requirements for their applications until it is time for an application compliance audit.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer system includes memory hardware configured to store structured executor data, multiple compliance articles, and computer-executable instructions. The multiple compliance articles each define at least one compliance requirement, and the structured executor data defines multiple executor microservices that are each specific to a corresponding automated code analysis module. The system includes processor hardware configured to execute the instructions. The instructions include receiving, by an automated compliance engine, a compliance check request for an application in development via a continuous integration environment, and obtaining, by the automated compliance engine, one or more of the multiple compliance articles that are associated with the application. The instructions include identifying, by the automated compliance engine, one or more of the multiple executor microservices that are associated with each obtained compliance article, calling each of the identified one or more executor microservices to obtain structured compliance data from the corresponding automated code analysis module via the executor microservice, automatically determining a compliance posture of the application according to a comparison of the structured compliance data with one or more compliance requirements of each obtained compliance article, and selectively deploying the application to a production environment according to the determined compliance posture of the application.

In other features, the memory hardware is configured to store an archive database, and the instructions further include generating, by the automated compliance engine, a compliance audit report, and storing the compliance audit report in the archive database. The compliance audit report includes the determined compliance posture of the application and at least a portion of the structured compliance data. In other features, the automated compliance engine includes a compliance application programming interface (API), and receiving the compliance check request includes receiving a call to the compliance API in response to a production environment deployment request in the continuous integration environment.

In other features, the continuous integration environment includes a continuous integration (CI) pipeline, and the CI pipeline includes at least a build phase, a package phase and a deploy phase, and receiving the compliance check request includes receiving the call to the compliance API while the application is at the deploy phase of the CI pipeline. In other features, the memory hardware is configured to store a Jenkins Conduit pipeline file specifying one or more parameters of the CI pipeline, the multiple compliance articles in a compliance repository, and the structured compliance data in an automated code analysis tool database. In other features, the corresponding automated code analysis module includes at least one of a SonarQube automated code analysis tool and a Veracode automated code analysis tool.

In other features, the memory hardware is configured to store at least one compliance goal associated with the application, and obtaining the one or more compliance articles includes obtaining one or more compliance articles corresponding to the at least one compliance goal associated with the application. In other features, the at least one compliance goal includes one or more of an application deployment to a specified cloud-based service, an application deployment to a data privacy implementation including Health Insurance Portability and Accountability Act (HIPAA) information, and an application deployment to a financial implementation including Sarbanes-Oxley (SOX) compliance. In other features, the one or more compliance requirements include at least one of a specified code coverage requirement, a specified vulnerability count threshold, a specified code quality value, a specified penetration test value, and a specified code security test value.

In other features, the instructions further include generating a compliance failure message in response to a determination that the compliance posture of the application is non-compliance, and the compliance failure message includes at least a portion of the structured compliance data that did not meet the compliance requirement of at least one of the obtained compliance articles associated with the application. In other features, calling each of the identified one or more executor microservices includes calling multiple ones of the identified executor microservices in parallel using one or more read/write mutexes for synchronization and coordination of the identified executor microservices. In other features, the memory hardware is configured to store structured application data for applications in development via the continuous integration environment.

A computerized method for automated application compliance processing includes receiving, by an automated compliance engine, a compliance check request for an application in development via a continuous integration environment, and obtaining, by the automated compliance engine, one or more compliance articles that are associated with the application. The one or more compliance articles each define at least one compliance requirement. The method includes identifying, by the automated compliance engine, one or more executor microservices that are associated with each obtained compliance article. The one or more executor microservices are each specific to a corresponding automated code analysis module. The method includes calling each of the identified one or more executor microservices to obtain structured compliance data from the corresponding automated code analysis module via the executor microservice, automatically determining a compliance posture of the application according to a comparison of the structured compliance data with one or more compliance requirements of each obtained compliance article, and selectively deploying the application to a production environment according to the determined compliance posture of the application.

In other features, the method includes generating, by the automated compliance engine, a compliance audit report, and storing the compliance audit report in an archive database. The compliance audit report includes the determined compliance posture of the application and at least a portion of the structured compliance data. In other features, the automated compliance engine includes a compliance application programming interface (API), and receiving the compliance check request includes receiving a call to the compliance API in response to a production environment deployment request in the continuous integration environment.

In other features, the continuous integration environment includes a continuous integration (CI) pipeline, and the CI pipeline includes at least a build phase, a package phase and a deploy phase, and receiving the compliance check request includes receiving the call to the compliance API while the application is at the deploy phase of the CI pipeline.

In other features, obtaining the one or more compliance articles includes obtaining one or more compliance articles corresponding to at least one compliance goal associated with the application. In other features, the at least one compliance goal includes one or more of an application deployment to a specified cloud-based service, an application deployment to a data privacy implementation including Health Insurance Portability and Accountability Act (HIPAA) information, and an application deployment to a financial implementation including Sarbanes-Oxley (SOX) compliance. In other features, the one or more compliance requirements include at least one of a specified code coverage requirement, a specified vulnerability count threshold, a specified code quality value, a specified penetration test value, and a specified code security test value. In other features, calling each of the identified one or more executor microservices includes calling multiple ones of the identified executor microservices in parallel using one or more read/write mutexes for synchronization and coordination of the identified executor microservices.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

The present disclosure describes automated, programmatic retrieval and archiving of compliance postures of applications under development—in, for example, a continuous integration environment. In various implementations, executor microservices may be used in combination with an automated compliance engine and compliance articles, which together may be referred to as an Adjudicator system. For example, an Adjudicator system may programmatically describe compliance rules for software applications. The Adjudicator system may then automatically gather data to execute those compliance rules from existing data repositories where compliance data is stored for the applications.

In various implementations, the Adjudicator system may include multiple modular components. An automated compliance engine contains the logic and processing for determining a compliance posture of an application. Compliance articles are programmatic representations of compliance rules, and executor microservices (also referred to as Executors) handle data collection and aggregation from appropriate information systems where compliance data is stored. An Open Policy Engine (OPA) implementation may be used to process data retrieved by the executor microservices against the defined compliance articles, where the Adjudicator system is responsible for the logic, retrieval, and archiving of the data itself.

The automated application compliance processing system may allow application developers to ensure the compliance posture of an application they are developing automatically. If developers of the application use a continuous integration and continuous delivery or continuous deployment (CICD) process, the application compliance posture may be automatically checked, for example, on every commit made to the application's repository. The system may also allow for application developers to provide the output of their compliance report to auditors, where the compliance report contains all required data that was automatically collected by the system and is necessary to satisfy the auditor request.

Automated Compliance Processing System

Figure 1:
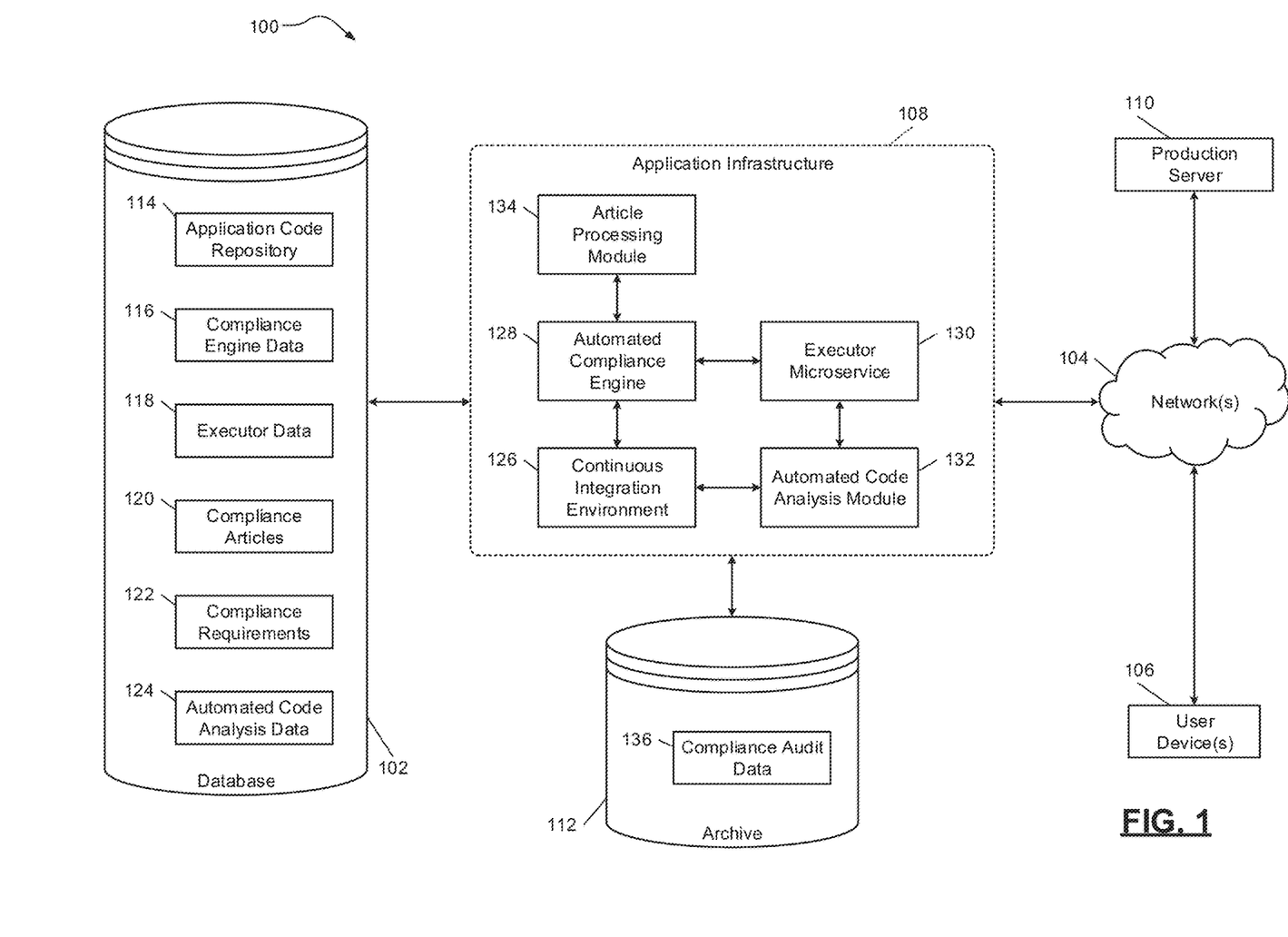
FIG. 1 is a functional block diagram of a system for executing microservices for automated compliance processing.

FIG. 1 is a functional block diagram of an example system 100 for automated compliance processing using executor microservices, which includes a database 102. While the system 100 is generally described as being deployed in a computer network system, the database 102 and/or components of the system 100 may otherwise be deployed (for example, as a standalone computer setup). The system 100 may include a desktop computer, a laptop computer, a tablet, a smartphone, etc.

As shown in FIG. 1, the database 102 stores an application code repository 114, compliance engine data 116, executor data 118, compliance articles 120, compliance requirements 122, and automated code analysis data 124. In various implementations, the database 102 may store other types of data as well. The application code repository 114, compliance engine data 116, executor data 118, compliance articles 120, compliance requirements 122, and automated code analysis data 124 may be located in data structures in different physical memories within the database 102, such as different random access memory (RAM), read-only memory (ROM), a non-volatile hard disk or flash memory, etc. In some implementations, the application code repository 114, compliance engine data 116, executor data 118, compliance articles 120, compliance requirements 122, and automated code analysis data 124 may be located in the same memory (such as in different address ranges of the same memory). In various implementations, the application code repository 114, compliance engine data 116, executor data 118, compliance articles 120, compliance requirements 122, and automated code analysis data 124, may each be stored as structured data in any suitable type of data store.

The system 100 includes an application infrastructure 108, which may be used to develop software applications and check for compliance postures of the software applications. For example, the application infrastructure 108 includes a continuous integration environment 126, and application developers may access the continuous integration environment 126 to develop software applications.

In various implementations, users may access the continuous integration environment 126 via a user device 106. The user device 106 may include any suitable user device for displaying text and receiving input from a user, including a desktop computer, a laptop computer, a tablet, a smartphone, etc. The user device 106 may access the database 102 directly, or may access the database 102 through one or more networks 104 and the application infrastructure 108. Example networks may include a wireless network, a local area network (LAN), the Internet, a cellular network, and so on.

Figure 2:
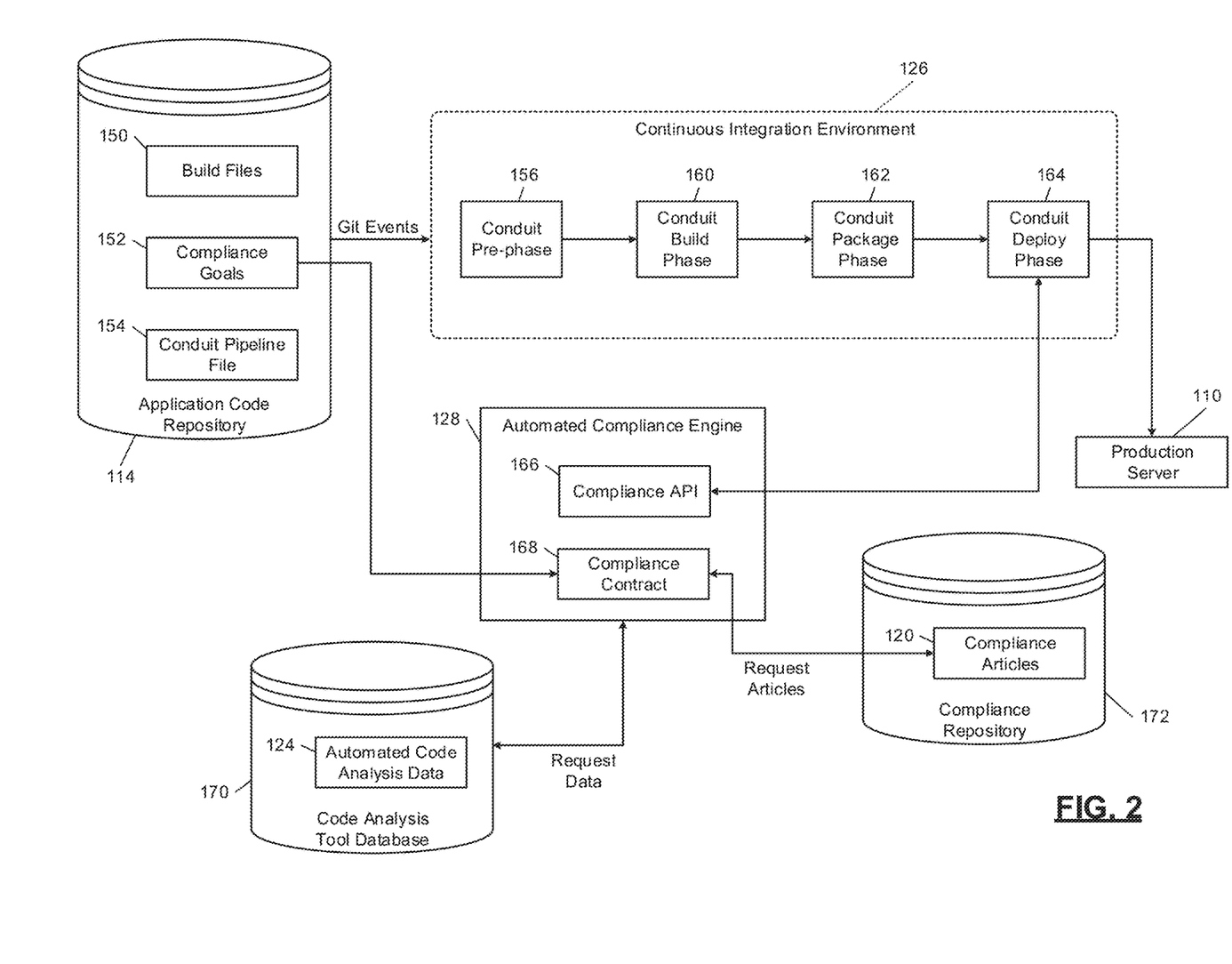
FIG. 2 is a functional block diagram of a continuous integration pipeline for use in the system of FIG. 1.

The continuous integration environment 126 may include any suitable environment for developing software applications, such as an environment that allows multiple application developers to integrate code into a shared repository frequently (for example, multiple times a day). Each integration can then be verified by automated builds, and optional automated testing. As shown in FIG. 1, the application infrastructure 108 may communicate with a production server 110 via the network(s) 104. For example, the continuous integration environment 126 may deploy a production version of application code to the production server 110. An example continuous integration pipeline is illustrated in FIG. 2 and described further below.

As shown in FIG. 1, the application infrastructure 108 includes an automated compliance engine 128 that communicates with the continuous integration environment 126. The automated compliance engine 128 also communicates with an article processing module 134 and an executor microservice 130. For example, the automated compliance engine 128 may determine compliance requirements for an application being developed in the continuous integration environment 126, and use the article processing module 134 to determine a compliance posture of the application.

In various implementations, the automated compliance engine 128 may call one or more executor microservice 130 to obtain compliance data for the application. Each executor microservice 130 may obtain compliance data from an automated code analysis module 132. For example, automated code analysis modules like SonarQube and Veracode may automatically obtain compliance data for an application developed in the continuous integration environment 126. The executor microservice 130 may obtain compliance data from the automated code analysis module 132, and return the compliance data to the automated compliance engine 128. The automated compliance engine 128 may then use the article processing module 134 to determine whether the obtained compliance data meets compliance requirements specific to the application currently in development in the continuous integration environment 126.

As shown in FIG. 1, the system 100 includes an archive 112, which may include any suitable database for storing compliance audit data 136. For example, the compliance audit data 136 may store a determination by the automated compliance engine 128 of whether the application in development in the continuous integration environment 126 is in compliance. In addition, data obtained from the automated code analysis module 132 via the executor microservice 130 may also be stored in the compliance audit data 136 to provide evidence of the compliance posture of the application for whenever a compliance audit is performed at a future date. Although FIG. 1 illustrates the archive 112 as separate from the database 102, in various implementations the archive 112 that stores the compliance audit data 136 may be part of the database 102.

Referring back to the database 102, the application code repository 114 may be any suitable repository for storing data related to an application in development via the continuous integration environment 126. For example, a GitHub repository or other suitable repository may store one or more build files of the application in development. The compliance engine data 116 may include any suitable data for operating the automated compliance engine 128. For example, the compliance engine data 116 may include data for accessing the executor microservice 130, for accessing the article processing module 134, for performing processing rules on the data obtained by the executor microservice 130 and the article processing module 134, and so on.

The executor data 118 may include any suitable data related to microservices for obtaining data from the automated code analysis module 132. For example, the executor data 118 may include different microservices that correspond to different automated code analysis tools, such as an executive microservice for SonarQube, another executive microservice for Veracode, and so on. The executor data 118 may store information about formatting of reports returned by the automated code analysis tools, parsing information for specific compliance outputs from the automated code analysis tools, and so on.

The compliance articles 120 may include articles that are specific to different goals of the application in development in the continuous integration environment 126. For example, different compliance articles 120 may be used when an application is going to be used with certain cloud services (such as Amazon Web Services), certain data privacy implementations like HIPAA, an implementation that requires Sarbanes-Oxley (SOX) compliance, and so on. Each of the compliance articles 120 may include one or more compliance requirements 122. Example compliance requirements may include, but are not limited to, specified percentages of code coverage, specified numbers of vulnerabilities (such as zero high vulnerabilities), a specified code quality value, a specified number of penetration test risks, and so on. The automated code analysis data 124 may include output reports from the automated code analysis module 132.

FIG. 2 illustrates a functional block diagram illustrating further details of a continuous integration (CI) pipeline of the continuous integration environment 126. In this example, a Conduit pipeline is illustrated, although other suitable CI pipelines could be used in various implementations. The CI pipeline of the continuous integration environment 126 as illustrated in FIG. 2 includes a Conduit pre-phase 156 that feeds a Conduit build phase 160. The Conduit build phase 160 then feeds a Conduit package phase 162, which supplies a Conduit deploy phase 164.

FIG. 2 also illustrates the application code repository 114 as including build files 150, compliance goals 152, and a Conduit pipeline file 154. The build files 150 may include files related to builds of code of the application in development in the continuous integration environment 126. The application code repository 114 may supply Git events to the continuous integration environment 126 (for example, when the application code repository 114 is a GitHub repository). The Conduit pipeline file 154 may be used to specify operation of the continuous CI pipeline in the continuous integration environment 126 (such as a Jenkins Conduit pipeline file).

The automated compliance engine 128 includes a compliance API 166 and a compliance contract 168. The compliance contract 168 may receive the compliance goals 152 from the application code repository 114. For example, one or more compliance goals associated with the application in development in the continuous integration environment 126 may be supplied to the automated compliance engine 128, where the compliance contract 168 identifies compliance requirements that need to be checked based on the compliance goals 152. For example, if a compliance goal for the application in development is to be used with a specific cloud-based service, the cloud-based service in the compliance contract 168 may have specified requirements for code coverage, high vulnerability numbers, and so on.

The compliance contract 168 may be used by the automated compliance engine 128 to obtain compliance articles 120 from the compliance repository 172. For example, prior to the continuous integration environment 126 deploying an application to production by the Conduit deploy phase 164, a compliance check may be requested via the compliance API 166 of the automated compliance engine 128. The automated compliance engine 128 requests data from the code analysis tool database 170, such as the automated code analysis data 124, in order to determine whether the application at the Conduit deploy phase 164 is in compliance and suitable for moving to production.

FIG. 2 may be considered as a CICD view, illustrating an example arrangement of where the automated compliance engine 128 fits in the CICD pipeline. For example, the CICD pipeline may include different phases, stages, work items, and so on, which may be used with various builds, packaged deploys, and testing. As shown in FIG. 2, the automated compliance engine 128 is used before production deployment of the application under development. For example, the automated compliance engine 128 may reach out to various automated code analysis tools such as SonarQube and Veracode, such as via the executor microservices, to get compliance data for the application.

The automated compliance engine 128 may then put the obtained compliance data through one or more compliance articles 120 associated with the application, to make a determination on the compliance posture of the application. If the automated compliance engine 128 determines that the application is in compliance, the application may be allowed to proceed from the Conduit deploy phase 164 to the production server 110.

In some embodiments, services may be implemented as pods having containers. One or more instances of an Adjudicator including an automated compliance engine 128 may reach out to, for example, a Consul implementation, to obtain whatever data is needed to determine a compliance posture of an application. The automated compliance engine 128 may request to see what services are running to retrieve data from automated code analysis tools. For example, compliance articles may be written using a combining file or manifest that identifies what schema (such as an output from SonarQube like a number of vulnerabilities) is required to satisfy a compliance requirement.

As an example, when writing a compliance article that requires use of SonarQube, a SonarQube schema may be named in the article. The schema is used to call executor microservices, which may be obtained from Consul. For example, executor microservices may be registered to Consul and the executor microservices may identify what schemas they support for specific tools. When the automated compliance engine 128 sees a schema named in a compliance article, it may filter through registered executor microservices to see which ones support the schema, in order to determine which executor microservices to call to obtain compliance data specific to the article.

Figure 3:
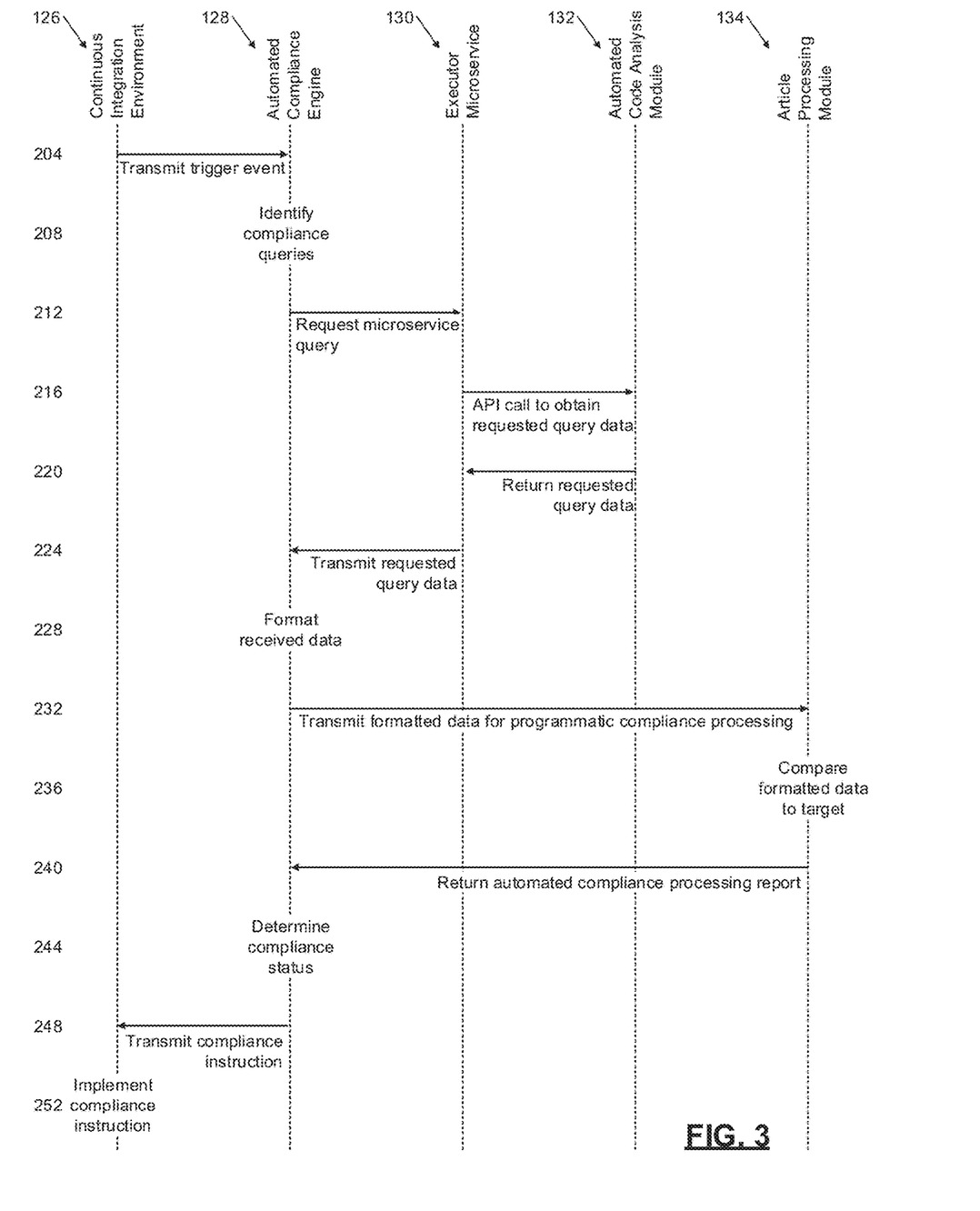
FIG. 3 is a message sequence chart illustrating example interactions between elements of the system of FIG. 1.

FIG. 3 is a message sequence chart illustrating example interactions between the continuous integration environment 126, the automated compliance engine 128, the executor microservice 130, the automated code analysis module 132, and the article processing module 134, during automated application compliance processing by the system 100. As shown in FIG. 3, the continuous integration environment 126 transmits a trigger event to the automated compliance engine 128, at line 204. For example, an application compliance check may be triggered when a user requests that an application at the Conduit deploy phase 164 should be moved to production, so that compliance may be checked prior to the application actually going to the production server 110.

At line 208, the automated compliance engine 128 identifies compliance queries. For example, the automated compliance engine 128 may identify compliance requirements that are associated with the application in development, based on compliance goals associated with the application. At line 212, the automated compliance engine 128 requests a microservice query from the executor microservice 130. Executor microservice requests may be based on specific compliance requirements of the application, where each executor microservice corresponds to different automated code analysis tools or different compliance requirements for an application.

The executor microservice 130 calls an API to obtain requested query data from the automated code analysis module 132, at line 216. For example, the executor microservice 130 may call an API of, for example, SonarQube or Veracode, to obtain a code compliance report from SonarQube or Veracode. The automated code analysis module 132 then returns requested query data to the executor microservice 130, at line 220. The return data may be in the form of a standard report supplied by a tool of the automated code analysis module 132.

At line 224, the executor microservice 130 transmits the requested query data to the automated compliance engine 128. In various implementations, the executor microservice 130 may be configured to parse data returned by the automated code analysis tool in a report, and supply specified compliance data from the report to the automated compliance engine 128. In this manner, the executor microservices 130 may provide abstraction to the automated compliance engine 128, where the executor microservices 130 can be added and removed as different automated code analysis tools are used and different compliance requirements are updated, without requiring changes to the automated compliance engine 128 itself for every modification.

The automated compliance engine 128 may format the received data, at line 228. For example, the automated compliance engine 128 may use one or more rules to format data received from the executor microservice 130 into a standard format for use by the article processing module 134. At line 232, the automated compliance engine 128 transmits the formatted data to the article processing module 134 for programmatic compliance processing. Although the article processing module 134 is illustrated as separate from the automated compliance engine 128 in FIG. 3, in various implantations the article processing module 134 may be part of the automated compliance engine 128. Similarly, the executor microservices 130 may be stored as part of the automated compliance engine 128 in various implementations.

At line 236, the article processing module 134 compares the formatted data to a target. For example, the article processing module 134 may compare formatted data to compliance requirements of a compliance article that is specific to the application under development, in order to determine whether the compliance posture of the application meets the compliance requirements of the article for the application. The article processing module 134 returns the automated compliance processing report to the automated compliance engine 128, at line 240.

The automated compliance engine 128 determines a compliance status of the application, at line 244. For example, the automated compliance engine 128 may determine whether the application is in compliance or is not in compliance, based on the comparison of the obtained compliance data for the application with the compliance requirements of the application. At line 248, the automated compliance engine 128 transmits a compliance instruction (such as whether the application passed compliance) to the continuous integration environment 126. The continuous integration environment 126 then implements a compliance instruction at 252. For example, if the compliance instruction indicates the application is in compliance, the continuous integration environment 126 may allow the application to proceed to production. If the compliance instruction indicates the application is not in compliance, a denial may be provided to the user, possibly with an explanation of the reasoning for the failed compliance requirement.

Automated Application Compliance Process

Figure 4:
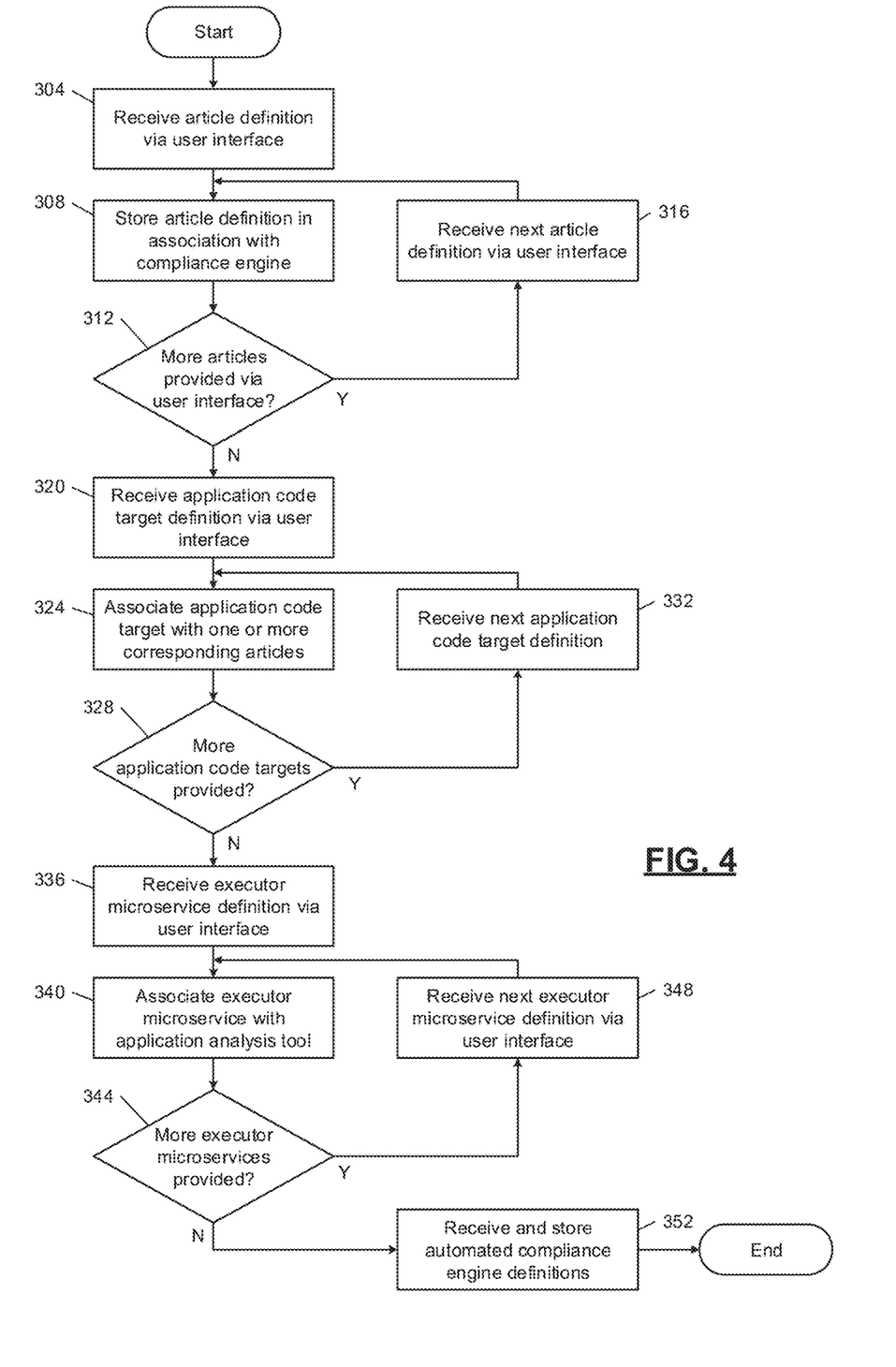
FIG. 4 is a flowchart illustrating an example process for creating articles for automated compliance processing.

FIG. 4 illustrates an example process for creating compliance articles and associated executor microservices. As shown in FIG. 4, control begins at 304 by receiving an article definition via a user interface. For example, the user may define a new article to be used by the automated compliance engine 128, such as an article to be applied if an application is intended to be used with a cloud-based service (for example, Amazon Web Services).

At 308, control stores the article definition in association with the compliance engine. For example, the article definition may be stored as a compliance article 120 in the database 102, to be accessed by the automated compliance engine 128. At 312, control determines whether more articles have been provided via the user interface. If so, control proceeds to 316 to retrieve the next article definition via the user interface (for example, a user interface of the user device 106), and then stores the additional article definition and association with compliance engine at 308.

Once control determines at 312 that no more articles have been provided via the user interface, control proceeds to 320 to receive application code target definitions via the user interface. For example, the user may define one or more application code targets for each application in development, which may be referred to as compliance goals. The compliance goals may be stored as compliance requirements 122 in the database 102, and may be stored in an application code repository in association with the application in development.

At 324, control associates the application code target with one or more corresponding articles. For example, one or more rules may be established in the automated compliance engine 128 about which articles are to be applied for each compliance goal associated with an application in development. At 320, control determines whether more application code targets have been provided. If so, control proceeds to 332 to receive a next application code target definition, and associates the application code target with one or more corresponding articles at 324.

If control determines at 328 that no more application code targets have been provided, control proceeds to 336 to receive an executor microservice definition via the user interface. For example, a user may define one or more executor microservices to obtain compliance data from one or more automated code analysis tools. Control associates the executor microservice with an application analysis tool at 340. For example, one or more rules of the automated compliance engine 128 may be defined to determine which executor microservice(s) should be called for each application analysis tool.

At 344, control determines whether any more executor microservices have been provided. If so, control proceeds to 348 to receive a next executive microservice definition via the user interface. Control associates the next executive microservice definition with the application analysis tool at 340. If control determines at 344 that no more executor microservices have been provided, control proceeds to 352 to receive and store automated compliance engine definitions. The stored automated compliance engine definitions may be used by the automated compliance engine 128 to determine compliance postures for applications in development.

Figure 5:
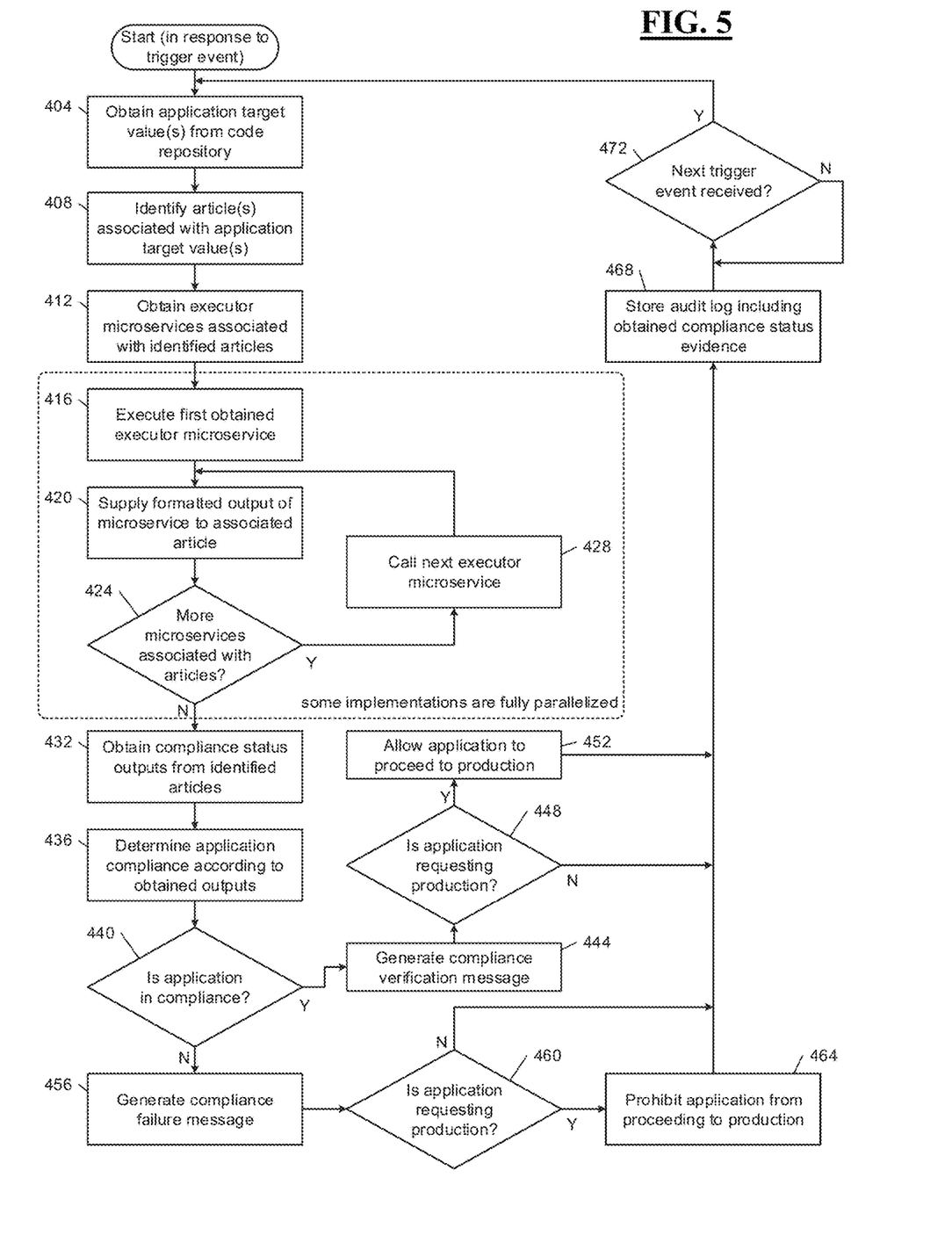
FIG. 5 is a flowchart illustrating an example process for executing microservices for automated compliance processing.

FIG. 5 illustrates an example process for automated application compliance processing. The process of FIG. 5 starts in response to a trigger event, such as a continuous integration environment 126 requesting compliance check for an application is about to be deployed to production. At 404, control obtains application target value(s) from a code repository. Control then identifies one or more articles associated with the application target values at 408.

At 412, control obtains executive microservices associated with identified articles. For example, control may determine which executive microservices correspond with compliance requirements in the identified articles 408. At 416, control executes the first obtained executive microservice. Executing the executor microservice may cause the executor microservice to call an API of an automated code analysis tool to obtain a compliance report regarding application compliance from the code analysis tool.

The 420, control supplies the formatted output from the executor microservice to the associated compliance article. Control then determines at 424 whether more microservices are associated with the articles. If so, control proceeds to 428 to call the next executor microservice, and returns to 420 to supply the formatted output of the executor microservice to the associated compliance article. Although FIG. 5 illustrates steps 416 through 428 as operating in a sequential manner, in various implementations multiple executor microservices may be operated in parallel. FIG. 5 illustrates a block surrounding steps 416 to 424 to indicate the optional parallel operation of the executor microservices.

For example, the executor microservices may be parallelized partially or fully, where all microservices are executed at once in separate threads or processes, such as separate Goroutines in Golang. The parallelism may be implemented with synchronization and coordination. For example, read/write mutexes may be used for an optimal concurrency approach without affecting performance significantly. In various implementations, the read/write mutexes may provide the best runtime behavior for coordination and interlocking, in order to implement the parallelism of the executor microservices with correct concurrency primitives. The optional use of Goroutines, where processes may not be tied to underlying processor threads, may allow for up to thousands of threads without significantly affecting system performance.

Once control determines at 424 that no more executor microservices are associated with the compliance articles, control proceeds to 432 to obtain compliance status outputs from the compliance articles. For example, the identified compliance articles may be used to evaluate the compliance data in the reports obtained by the executor microservices, and determine whether the compliance data satisfies the compliance requirements of the compliance article.

At 436, control determines whether the applications in compliance, according to the obtained outputs from identified articles. If the application is in compliance of 440, control proceeds to 444 to generate a compliance verification message. The 448, control determines whether the application is requesting production. If so, control proceeds to 452 to allow the application to move to production. After allowing the application to proceed to production at 452, or if the application is not requesting production 448, control proceeds to 468 to store an audit log including the obtained compliance status evidence.

Referring back to 440, if control determines that the application is not in compliance, control proceeds to 456 to generate a compliance failure message. Control then determines whether the application is requesting production at 460. If so, control prohibits the application from proceeding to production at 464. After prohibiting the application from moving to production at 464, or if the application is not requesting production, control proceeds to 468 to store an audit log including the obtained evidence of compliance status.

Control then proceeds to 472 to determine whether a next trigger has been received. For example, another compliance check may be requested by the CI pipeline if another application is seeking to move to the production environment. If the next trigger event has not been received at 472, control continues to wait until a trigger event is received. Once the next trigger event is received at 472, control returns to 404 obtain application targets from the code repository.

Figure 6:
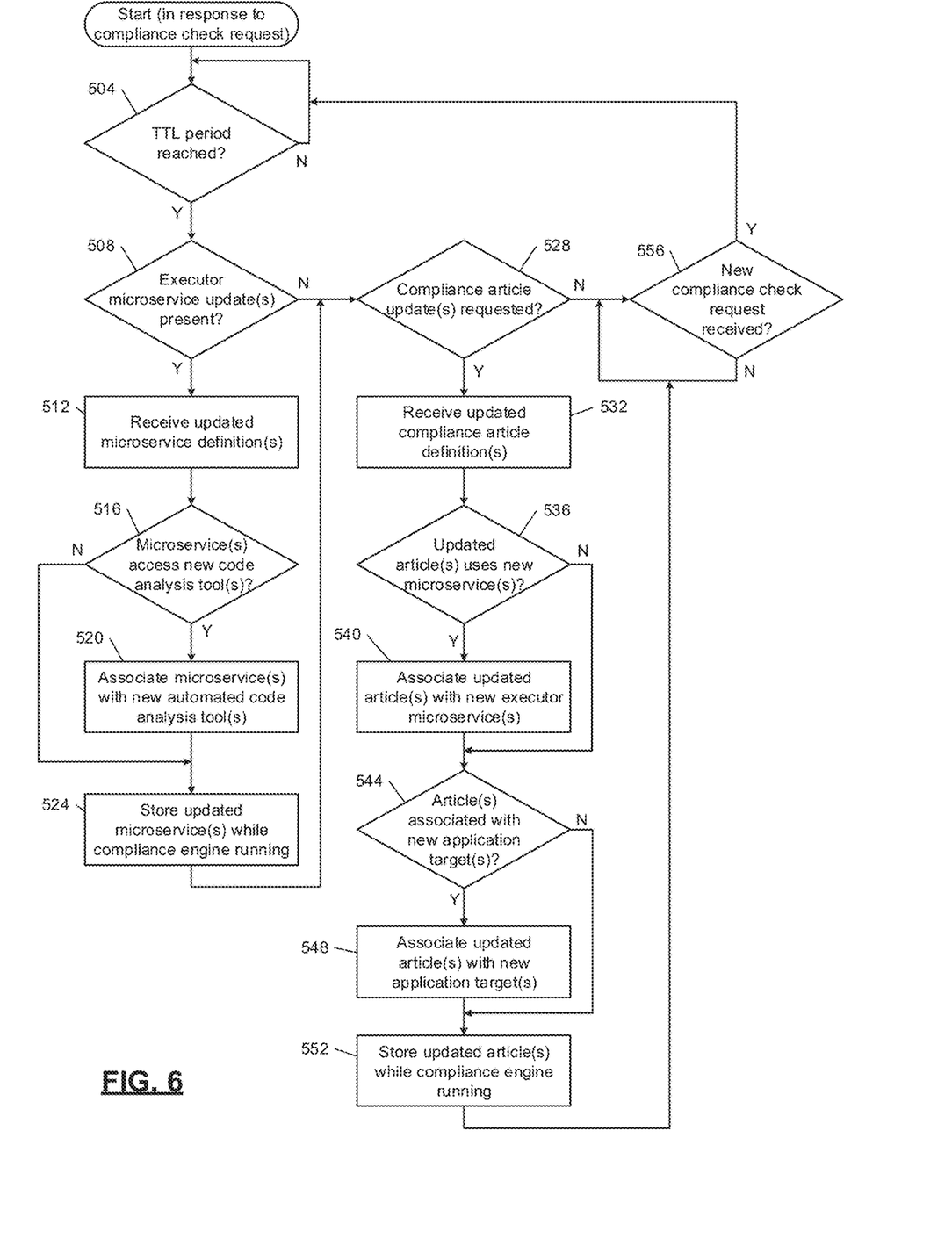
FIG. 6 is a flowchart illustrating an example process for updating microservices and compliance article definitions.

FIG. 6 illustrates an example process for updating executor microservices and compliance articles, such as making updates to these elements in the system 100. The example process of FIG. 6 may start in response to a compliance check request, which may come from the continuous integration environment 126. At 504, control determines a time-to-live (TTL) time period has been reached. If not, control continues waiting until the TTL time period is reached. Any suitable time period may be used, such as about two minutes.

Once control determines at 504 that the TTL time period has been reached, control proceeds to 508 to determine whether the executor microservice updates are present. If so, control proceeds to 512 to receive the updated executor microservice definitions. Control then proceeds to 516 determine whether the executor microservices access any new code analysis tools. If so, control associates the executor microservices with the new automated code analysis tools at 520. After associating the executor microservices at 520, or if the executor microservices are determined to not access new code analysis tools at 516, control proceeds to store updated microservices at 524.

After storing the updated executor microservices at 524, or if control determines at 508 that the executor updates are not present, control proceeds to 528 to determine whether compliance article updates are requested. If compliance article updates are requested 528, control proceeds to 532 to receive updated compliance article definitions.

Control then determines at 536 whether the updated compliance articles use new executor microservices. If so, control proceeds to 540 to associate the updated compliance articles with the new executive micro-services. After associating the update articles at 540, or if control determines at 536 that the compliance article did not use new executor microservices, control proceeds to 544 to determine whether any compliance articles are associated with new application targets. If so, control associates the updated compliance articles with the new application targets at 548. After associating the updated compliance articles, or if control determines at 544 that the compliance articles are not associated with application targets, control proceeds to 552 to store the updated compliance articles while the compliance engine is running.

Control then proceeds to 556 to determine whether a new compliance check has been requested. If not, control continues to wait until a new compliance check request is received, such as a compliance request from the continuous integration environment 126 prior to deploying an application to production. Once control determines the new compliance check request has been received at 556, control returns to 504 to determine whether the TTL period has been reached.

In various implementations, actual updating of executor microservices may be done in an automated fashion, based on a TTL time period such as two minutes (or more or less). For example, whenever a compliance article bundle is built, it may be put into a database such as Artifactory as a packaged tar file. Every TTL period, the automated compliance engine 128 may check the Artifactory database for a newer version. For example, if a current version used by the automated compliance engine 128 is 0915, the automated compliance engine 128 may check for version 0916 or above, and pull it down if the newer version exists. An ETag number (such as a Sha256) of the newer version may be compared to a version in the Open Policy Agent (OPA), and determine whether the new bundle should be hosted.

The automated compliance engine 128 may sit on top of an OPA implementation, and look for a static destination to download bundles from. In various implementations, the bundles must be served at a same URL, so a deterministic decision is made of what bundle to host or not host. For example, if it is desired for the OPA to download a bundle version 0916, control may change a configuration and restart a service, or control may stop hosting the bundle version 0915 at a/bundles endpoint and then re-host the bundle version 0916 at the same endpoint so that OPA detects the change.

In various implementations, the automated compliance engine may host a new bundle for OPA if the automated compliance engine detects a new bundle. The OPA implementation then downloads the new bundle from the automated compliance engine, such as after an ETag comparison. In various implementations, there may not be an actual association of compliance articles with executor microservices at the bundle update time. For example, the associations between compliance articles and executor microservices may not be implemented when the updated bundle is stored, and the association may instead be implemented at runtime (such as the automated compliance engine looking to a currently loaded bundle to identify executor microservices in response to a user requesting a compliance status of an application).

For example, with each call to the automated compliance engine 128, the engine may reach out to Consul to see what executor microservices are currently available. In this way, updating of what executor microservices currently exist may be performed in response to a user compliance check request. In various implementations, a TTL time period may be set on an internal cache of the automated compliance engine 128. If the time since the last update is greater than the TTL period when the user makes a compliance check request, the automated compliance engine 128 may call to Consul to get a new list of executor microservices that currently exist, set the list of executor microservices in the internal cache, and reset the TTL period.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer system comprising:
    memory hardware configured to store structured executor data, multiple compliance articles, and computer-executable instructions, wherein:
        the multiple compliance articles each define at least one compliance requirement, and
        the structured executor data defines multiple executor microservices that are each specific to a corresponding automated code analysis module; and
    processor hardware configured to execute the instructions, wherein the instructions include:
        receiving, by an automated compliance engine, a compliance check request for an application in development via a continuous integration environment;
        obtaining, by the automated compliance engine, one or more of the multiple compliance articles that are associated with the application;
        identifying, by the automated compliance engine, one or more of the multiple executor microservices that are associated with each obtained compliance article;
        calling each of the identified one or more executor microservices to obtain structured compliance data from the corresponding automated code analysis module via the executor microservice;
        automatically determining a compliance posture of the application according to a comparison of the structured compliance data with one or more compliance requirements of each obtained compliance article; and
        selectively deploying the application to a production environment according to the determined compliance posture of the application.

2. The computer system of claim 1, wherein:
    the memory hardware is configured to store an archive database, and
    the instructions further include:
        generating, by the automated compliance engine, a compliance audit report; and
        storing the compliance audit report in the archive database, wherein the compliance audit report includes the determined compliance posture of the application and at least a portion of the structured compliance data.

3. The computer system of claim 1, wherein:
    the automated compliance engine includes a compliance application programming interface (API); and
    receiving the compliance check request includes receiving a call to the compliance API in response to a production environment deployment request in the continuous integration environment.

4. The computer system of claim 3, wherein:
    the continuous integration environment includes a continuous integration (CI) pipeline, and the CI pipeline includes at least a build phase, a package phase and a deploy phase; and
    receiving the compliance check request includes receiving the call to the compliance API while the application is at the deploy phase of the CI pipeline.

5. The computer system of claim 4, wherein the memory hardware is configured to store:
    a Jenkins Conduit pipeline file specifying one or more parameters of the CI pipeline;
    the multiple compliance articles in a compliance repository; and
    the structured compliance data in an automated code analysis tool database.

6. The computer system of claim 5, wherein the corresponding automated code analysis module includes at least one of a SonarQube automated code analysis tool and a Veracode automated code analysis tool.

7. The computer system of claim 1, wherein:
the memory hardware is configured to store at least one compliance goal associated with the application, and
obtaining the one or more compliance articles includes obtaining one or more compliance articles corresponding to the at least one compliance goal associated with the application.

8. The computer system of claim 7, wherein the at least one compliance goal includes one or more of an application deployment to a specified cloud-based service, an application deployment to a data privacy implementation including Health Insurance Portability and Accountability Act (HIPAA) information, and an application deployment to a financial implementation including Sarbanes-Oxley (SOX) compliance.

9. The computer system of claim 7, wherein the one or more compliance requirements include at least one of a specified code coverage requirement, a specified vulnerability count threshold, a specified code quality value, a specified penetration test value, and a specified code security test value.

10. The computer system of claim 1, wherein:
the instructions further include generating a compliance failure message in response to a determination that the compliance posture of the application is non-compliance, and
the compliance failure message includes at least a portion of the structured compliance data that did not meet the compliance requirement of at least one of the obtained compliance articles associated with the application.

11. The computer system of claim 1, wherein calling each of the identified one or more executor microservices includes calling multiple ones of the identified executor microservices in parallel using one or more read/write mutexes for synchronization and coordination of the identified executor microservices.

12. The computer system of claim 1, wherein the memory hardware is configured to store structured application data for applications in development via the continuous integration environment.

13. A computerized method for automated application compliance processing, the method comprising:
receiving, by an automated compliance engine, a compliance check request for an application in development via a continuous integration environment;
obtaining, by the automated compliance engine, one or more compliance articles that are associated with the application, wherein the one or more compliance articles each define at least one compliance requirement;
identifying, by the automated compliance engine, one or more executor microservices that are associated with each obtained compliance article, wherein the one or more executor microservices are each specific to a corresponding automated code analysis module;
calling each of the identified one or more executor microservices to obtain structured compliance data from the corresponding automated code analysis module via the executor microservice;
automatically determining a compliance posture of the application according to a comparison of the structured compliance data with one or more compliance requirements of each obtained compliance article; and
selectively deploying the application to a production environment according to the determined compliance posture of the application.

14. The method of claim 13, further comprising:
generating, by the automated compliance engine, a compliance audit report; and
storing the compliance audit report in an archive database, wherein the compliance audit report includes the determined compliance posture of the application and at least a portion of the structured compliance data.

15. The method of claim 13, wherein:
the automated compliance engine includes a compliance application programming interface (API); and
receiving the compliance check request includes receiving a call to the compliance API in response to a production environment deployment request in the continuous integration environment.

16. The method of claim 15, wherein:
the continuous integration environment includes a continuous integration (CI) pipeline, and the CI pipeline includes at least a build phase, a package phase and a deploy phase; and
receiving the compliance check request includes receiving the call to the compliance API while the application is at the deploy phase of the CI pipeline.

17. The method of claim 15, wherein obtaining the one or more compliance articles includes obtaining one or more compliance articles corresponding to at least one compliance goal associated with the application.

18. The method of claim 17, wherein the at least one compliance goal includes one or more of an application deployment to a specified cloud-based service, an application deployment to a data privacy implementation including Health Insurance Portability and Accountability Act (HIPAA) information, and an application deployment to a financial implementation including Sarbanes-Oxley (SOX) compliance.

19. The method of claim 13, wherein the one or more compliance requirements include at least one of a specified code coverage requirement, a specified vulnerability count threshold, a specified code quality value, a specified penetration test value, and a specified code security test value.

20. The method of claim 13, wherein calling each of the identified one or more executor microservices includes calling multiple ones of the identified executor microservices in parallel using one or more read/write mutexes for synchronization and coordination of the identified executor microservices.

* * * * *